(12) United States Patent
French et al.

(10) Patent No.: US 9,555,949 B1
(45) Date of Patent: Jan. 31, 2017

(54) INSULATED BEVERAGE HOUSING WITH TEMPERATURE MAINTENANCE

(75) Inventors: Marcus French, Rogers, AR (US);
Barbara French, Rogers, AR (US);
Jeffrey Haynes, Leander, TX (US);
Joyce Hurd, West Newbury, MA (US)

(73) Assignee: Koolio, Inc., Rogers, AR (US)

( * ) Notice: Subject to any disclaimer, the term of this patent is extended or adjusted under 35 U.S.C. 154(b) by 559 days.

(21) Appl. No.: 13/599,395

(22) Filed: Aug. 30, 2012

Related U.S. Application Data

(63) Continuation-in-part of application No. 12/802,087, filed on May 28, 2010, now Pat. No. 8,534,345.

(51) Int. Cl.
*B65D 81/38* (2006.01)
*A47J 41/00* (2006.01)

(52) U.S. Cl.
CPC ........ *B65D 81/3883* (2013.01); *A47J 41/0044* (2013.01); *B65D 81/3872* (2013.01)

(58) Field of Classification Search
CPC ................ F25D 3/08; F25D 2303/0832; F25D 2303/0831; F25D 2303/0841; F25D 2331/803; F25D 2331/805; F25D 2331/809; F25D 2303/082; F25D 2303/0822; F25D 2303/08221; F25D 2331/8051; F25D 2331/808; F25D 2303/0821; F25D 2303/08321; A47G 19/2288; B65D 81/3883; B65D 81/3872; B65D 81/3897; B65D 81/3888; A47J 41/0044; A47J 31/50
USPC ........................................ 62/293, 457.4, 530
See application file for complete search history.

(56) References Cited

U.S. PATENT DOCUMENTS

| | | | |
|---|---|---|---|
| 3,082,900 A * | 3/1963 | Goodman | 220/592.17 |
| 3,766,975 A * | 10/1973 | Todd | 165/74 |
| 4,183,226 A * | 1/1980 | Moore | B65D 81/3883 |
| | | | 220/903 |
| 4,295,345 A | 10/1981 | Atkinson | 62/371 |
| 4,344,303 A | 8/1982 | Kelly, Jr. | 62/530 |
| 4,357,809 A | 11/1982 | Held et al. | 62/457 |
| 4,399,668 A | 8/1983 | Williamson | 62/457 |
| 4,768,354 A * | 9/1988 | Barnwell | B65D 81/3883 |
| | | | 220/592.17 |
| 4,782,670 A | 11/1988 | Long et al. | 62/457 |
| 4,793,149 A | 12/1988 | Riche | 62/293 |
| 4,955,516 A | 9/1990 | Satterfield | 224/35 |
| 4,961,324 A * | 10/1990 | Allan | A47J 41/00 |
| | | | 62/400 |
| 5,001,907 A | 3/1991 | LaCroix et al. | 62/457 |
| 5,109,588 A | 5/1992 | Hewlett et al. | 29/525.1 |
| 5,269,368 A | 12/1993 | Schneider et al. | 165/46 |
| 5,271,244 A * | 12/1993 | Staggs | 62/457.3 |
| 5,361,604 A | 11/1994 | Pier et al. | 62/457.4 |
| 5,419,154 A | 5/1995 | Christoff | 62/457.3 |

(Continued)

*Primary Examiner* — Tho V Duong
(74) *Attorney, Agent, or Firm* — Schrantz Law Firm, PLLC; Stephen D. Schrantz

(57) ABSTRACT

The insulated beverage housing provides an aperture for receiving a heat transfer body. Similarly, the heat transfer body provides an aperture for receiving a container. The heat transfer body stores a heat transfer material including but not limited to a fluid, gel, or other substance that can be heated or cooled depending upon the desired effect on the beverage. The removable heat transfer body may be easily removed and/or installed from the housing to heat or cool the heat transfer material for use in affecting the temperature of the beverage.

8 Claims, 23 Drawing Sheets

(56) References Cited

U.S. PATENT DOCUMENTS

| | | | |
|---|---|---|---|
| 5,934,100 A | 8/1999 | Hornick | 62/457.4 |
| 6,082,114 A | 7/2000 | Leonoff | 62/3.64 |
| 6,094,935 A * | 8/2000 | Stein | A47G 19/2288 62/457.3 |
| 6,103,280 A | 8/2000 | Molzahn et al. | 426/109 |
| 6,128,915 A | 10/2000 | Wagner | 62/457.3 |
| 6,134,894 A | 10/2000 | Searle et al. | 62/62 |
| 6,182,464 B1 | 2/2001 | Mamich | 62/316 |
| 6,305,175 B1 | 10/2001 | Searle et al. | 62/62 |
| 6,330,808 B1 * | 12/2001 | Kouwenberg et al. | 62/372 |
| 6,412,300 B2 | 7/2002 | Kaposi | 62/457.3 |
| 6,786,062 B1 | 9/2004 | Greenberg | 62/457.4 |
| 6,851,276 B2 | 2/2005 | Perrins | 62/457.5 |
| 7,010,935 B2 | 3/2006 | Citrynell et al. | 62/457.3 |
| 7,040,115 B1 | 5/2006 | Lopez et al. | 62/457.2 |
| 7,089,757 B2 | 8/2006 | Yang | 62/457.4 |
| 7,131,289 B2 | 11/2006 | Harl et al. | 62/457.2 |

* cited by examiner

INSULATED BEVERAGE HOUSING WITH TEMPERATURE MAINTENANCE

CROSS-REFERENCE TO RELATED APPLICATIONS

This application claims priority to and is a continuation-in-part of U.S. patent application Ser. No. 12/802,087 filed on May 28, 2010 entitled INSULATED BEVERAGE CONTAINER WITH TEMPERATURE MAINTENANCE, which issued as U.S. Pat. No. 8,534,345 on Sep. 17, 2013.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The invention relates to a beverage holder, and, more particularly, to a beverage holder having a housing, a heat transfer unit disposed within the housing for cooling and/or heating a beverage within the housing. People use insulated beverage holders to provide insulation to a beverage in order to maintain the temperature of the beverage. People either heat or cool their beverages to a desired temperature.

Placing the beverage within an insulated beverage housing insulates the beverage from the environment during consumption of the beverage. One type of insulated beverage holder is constructed from suitable foam configured to receive a beverage can. The foam insulation assists in maintaining the desired condition of the beverage.

Certain problems exist with the aforesaid prior art beverage holders. The beverage must initially be cooled or heated to the desired temperature. Once the beverage container is removed from its chilled environment, the beverage will adjust to the temperature of the environment. The insulated beverage container slows this result. It is an object of the present invention to provide a beverage holder that maintains a proper environment for sustaining the desired temperature of the beverage to allow a user to consume a beverage at the desired temperature over an extended period of time.

II. Description of the Known Art

Patents and patent applications disclosing information relevant to beverage systems are disclosed below. These patents and patent applications are hereby expressly incorporated by reference in their entirety.

U.S. Pat. No. 4,183,226 issued to Moore on Jan. 15, 1980 ("the '226 patent") teaches a means for chilling and insulating a canned or bottled beverage such as beer including a cylindrical sleeve of reusable refrigerant disposed within an insulative beverage can holder and displacing the annular "dead air" cavity between a beverage can situated therein and the side walls of the holder. The lining 24 taught by the '226 patent is formed of thin walled material such as plastic and may be slidably removable from the holder 10.

U.S. Pat. No. 4,782,670 issued to Long on Nov. 8, 1988 ("the '670 patent") teaches an insulated beverage container having both hot and cold retention capabilities designed for the purpose of maintaining, increasing, or decreasing the temperature of the contents in the container. The plastic structure of the container taught by the '670 patent, an insulating sleeve between duel walls of the container, and encapsuled between the dual walls, a thermoplastic gel capable of retaining heat as well as cold, produces a multi-action container which can be heated in a microwave oven, a conventional oven, or can be frozen in a freezer.

U.S. Pat. No. 5,419,154 issued to Christoff on May 30, 1995 ("the '154 patent") teaches a beverage container provided for use with a golf cart or the like having a support member. The container taught by the '154 patent includes a body having a central beverage receiving cavity which extends from the closed bottom of the body to the open top end of the body. The container taught by the '154 patent also includes means for receiving a freezable gel, the means being disposed within the beverage receiving cavity. The '154 patent also teaches a cap that is provided to be releasably attached to the open top end of the body.

The '154 patent teaches that inwardly from the bottom wall 20a is a cavity 122 which in the form of the invention illustrated in FIG. 10 of the drawings, extends across the bottom surface and up along the side walls of the container body 20. This cavity taught by the '154 patent is intended to be filled with a freezable gel 27. The '154 patent teaches that interposed between the walls of the cavity 122 and the exterior wall of the body 20 is an insulator wall 126 which, once the gel is frozen, will maintain that condition for a fixed period of time.

A hollow gel receiving chamber 128d is adapted to be filled with a freezable gel. This gel filled insert may be placed in a freezer apart from the cap 125 and the body 20 to be frozen. After the insert 128 is frozen, it may be matingly threaded into the female boss 126 on the top cap 125. The body 20 is then filled with an appropriate beverage and the top cap installed as previously described.

U.S. Pat. No. 5,269,368 issued to Schneider on Dec. 14, 1993 ("the '368 patent") teaches a reusable cooling and insulating device for bottles and the like that is provided in the form of a jacket having a single or plurality of flexible compartments which are interconnected having an inner chamber and an outer chamber therein. The '368 patent teaches that a heating and cooling temperature conditionable liquid is housed in the inner chamber which enables the inner diameter of the jacket formed by the inner chamber to confirm with the surface of the object on the which the jacket is positioned for heating or cooling. A flexible insulator of air or air and flexible plastic taught by the '368 patent is positioned in the outer chamber of each compartment for directing a greater temperature transfer from liquid to the object and less heat exchange from the liquid to the environment.

U.S. Pat. No. 6,134,894 issued to Searle on Oct. 24, 2000 ("the '894 patent") teaches a container for a beverage that has a conventional external configuration with a cylindrical wall closed by a top member. The '894 patent teaches that the contents of the container can be cooled, heated, or kept hot, or kept cold by the insertion of an insert into the external cavity. To ensure good heat transfer, the insert taught by the '894 patent is push fitted into the external cavity. The insert taught by the '894 patent may be heated or cooled before it is inserted, or it may be actuable to heat up or to cool down.

The can 10 taught by the '894 patent with its contents, but without its insert 30, is stored in a refrigerator, and the insert 30 is kept in a freezer until the material 31 therein is frozen solid. When it is required to use the can 10, the '894 patent teaches that it is removed from the refrigerator and the frozen insert 30 is inserted in its cavity 20. The insulating cap 28 taught by the '894 patent is put in place.

U.S. Pat. No. 6,128,915 issued to Wagner on Oct. 10, 2000 ("the '915 patent") teaches a portable food and beverage cooling device that includes a flexible cooling pouch having outer and inner faces. A cooling pack taught by the '915 patent is provided in the cooling pouch. A flexible insulating panel taught by the '915 patent is provided in the cooling pouch. The '915 patent teaches that the insulating panel has a central region interposed between the outer face of the cooling pouch and the cooling pack. Before use, the invention taught by the '915 patent is stored in a freezer to allow the coolant cells to freeze and be ready for use at a moments notice.

U.S. Pat. No. 6,094,935 issued to Stein on Aug. 1, 2000 ("the '935 patent") teaches a drinking container having a removable, freezable member. The drinking container taught by the '935 patent has a cylindrical inner receptacle and a surrounding cylindrical outer receptacle. The '935 patent teaches an annular chamber that is formed between the inner and outer receptacles. A refrigerant member taught by the '935 patent comprising a plastic envelope containing a freezable gel is dimensioned to fit into the annular chamber, and is readily removable therefrom. A cap taught by the '935 patent engages the drinking container to retain the refrigerant member once placed in the annular chamber. The '935 patent teaches that the refrigerant member is preferably an annular sleeve which slips between the inner and outer receptacles, and folds flat for storage and freezing. The '935 patent teaches that the drinking receptacle includes a removable cap which closes only the open chamber which receives the refrigerant member. The cap taught by the '935 patent both retains the refrigerant member, assists in insulating the same, and excludes condensate from the refrigerant chamber.

U.S. Pat. No. 5,361,604 issued to Pier on Nov. 8, 1994 ("the '604 patent") teaches a portable and hand-held beverage chilling device, having water utilized as a coolant that can be frozen between non-permanently sealed walls of the device, that is intended for chilling and subsequent maintenance of a canned or bottled beverage at its coldest liquid state, while providing direct consumption from its container. The beverage cooler taught by the '604 patent features two cylindrical receptacles that are enclosed on one end. These receptacles, called shells, taught by the '604 patent are of different diameter and height such that the inner is placed within the outer and a coolant is contained in the spacial void created.

U.S. Pat. No. 4,793,149 issued to Riche on Dec. 27, 1988 ("the '149 patent") teaches a cooling and insulating holder for a container such as a beverage can or the like that has a plurality of hollow arcuate reservoir pieces which fit together to form a ring with a receiving opening therein to receive the container.

U.S. Pat. No. 4,399,668 issued to Williamson on Aug. 23, 1983 ("the '668 patent") teaches a flexible, multilayer thermal wrap for beverage containers. The wrap taught by the '668 patent has an inner coolant layer for wrapping about the container which conforms to the container's shape and leaves an opening at the container's top to expose the pouring end. The coolant layer taught by the '668 patent is externally surrounded by an insulative layer.

The beverage holder of the present invention is especially adapted for maintaining the desired condition of the beverage for an extended period of time. The present invention overcomes many of the disadvantages of known insulated beverage holders by providing a heat transfer unit therein which cools or heats the beverage.

Therefore, the present invention is needed to improve the ability to heat or cool a beverage and to maintain the desired temperature of a beverage. The present invention is also needed to allow a user to replace the heat transfer unit with another heat transfer unit to continue to cool or heat the beverage as desired. The heat transfer unit may be removed from the housing when either heating or cooling the unit to reduce the insulating effect of the housing to reduce the time and energy required to adjust the temperature of the heat transfer unit.

SUMMARY OF THE INVENTION

The present invention provides a housing having an aperture adapted to receive a heat transfer unit. In one embodiment of the present invention, the housing is constructed with an insulated material to improve the functionality of the present invention and to increase the user's comfort. The heat transfer unit is adapted to fit within the aperture of the housing. The heat transfer unit also provides an aperture adapted to receive a beverage. In one embodiment, the heat transfer unit is adapted to receive a beverage container, such as a can, bottle, cup, or glass. A heat transfer sleeve of the heat transfer unit stores a fluid, gel, or other substance that can be heated or cooled depending upon the desired effect on the beverage. In one embodiment, the present invention may be used for cooling a beverage such that the heat transfer sleeve will have a coolant, such as water, a gel, or a chemical that will cause an endothermic reaction. In another embodiment, the present invention may be used for heating a beverage such that the heat transfer body will have a heat supplying material or a chemical that will cause an exothermic reaction.

The locking head of the present invention releasably attaches to the housing to secure the heat transfer body within the housing. A user can remove the locking head to remove a heat transfer body, to replace a heat transfer body, or to insert a heat transfer body to maintain the beverage at the desired temperature.

It is an object of the present invention to alter the temperature of a beverage by either heating or cooling the beverage as desired by the user.

It is another object of the present invention to provide an insulated housing to maintain the temperature of a beverage and to provide an insulated layer between the user's hand and the beverage while the user is holding the beverage.

It is another object of the present invention to provide a heat transfer body that maintains contact with a beverage container or is in close proximity of the beverage to heat or cool the beverage.

It is another object of the present invention to provide a heat transfer body that can be replaced with a different heat transfer body to control the temperature of the beverage.

It is another object of the present invention to deter heat transfer to the environment.

It is another object of the present invention to provide a heat transfer body that heats or cools to allow for a wide temperature range to be applied to the beverage.

It is another object of the present invention to provide a reusable heat transfer body that can placed within a housing.

It is another object of the present invention to provide a heat transfer body that may be removed from a housing to reduce the insulated effect of the housing when cooling or heating the heat transfer unit to reduce the time and energy required to change the temperature of the heat transfer body.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 17B is a cutaway view of a portion of one embodiment of the present invention;

DETAILED DESCRIPTION

Figure 1:
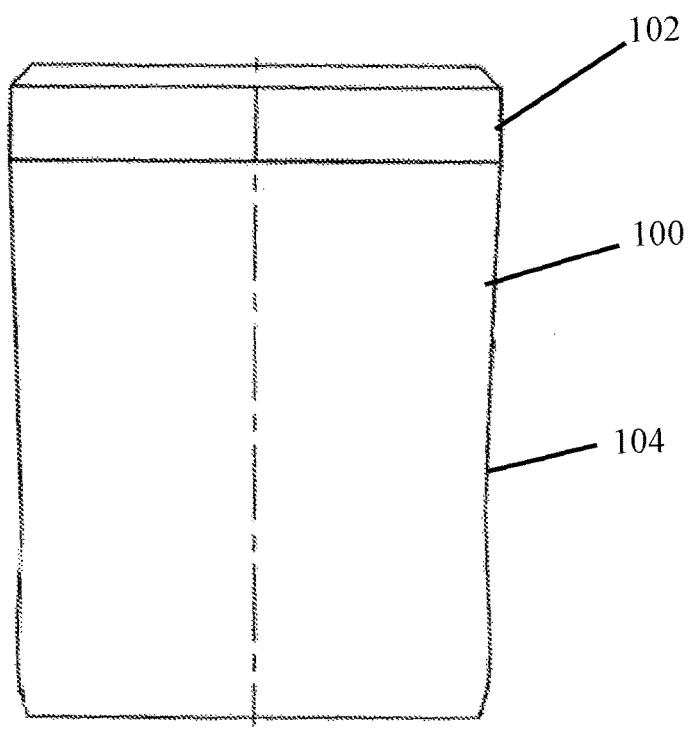
FIG. 1 is a front view of one embodiment of the present invention.

Referring to FIG. 1, the present invention relates to a beverage container for holding a beverage generally shown as 100. A housing 104 of the present invention provides a surface that partially surrounds a beverage. In one embodiment, the housing 104 has a side wall and a bottom wall that retains a beverage within the housing. The bottom wall may be an optional feature of the present invention. The side wall of housing 104 may provide an insulated surface that assists in maintaining the temperature of the beverage. The insulated side wall also limits the heat transfer from the environment and the user to the beverage. The side wall also increases the comfort of the user by limiting the heat or cold transferred to the user's hands to prevent the user's hands from direct contact with the beverage and/or beverage container. The housing 104 may be constructed from rubber, foam, plastic, metal, or other suitable materials. In one embodiment, additional insulation may be provided within housing 104. A sleeve aperture located at the top of the housing 104 allows a heat transfer sleeve to be placed within the housing for transferring heat or cold to either cool or heat the beverage.

The heat transfer unit 101 is a single unit constructed from cap 102, locking body 114, and heat transfer sleeve 110. The heat transfer unit 101 allows installation of the heat transfer sleeve 110 and cap 102 to the housing 150 as a single unit. A user may remove the heat transfer unit 101 to recharge the heat transfer sleeve 110 by either cooling or heating the heat transfer unit 101 depending upon the desired function. Removing housing 104 decreases the time needed to heat or cool the heat transfer unit 101 because of the reduced insulation due to the removal of housing 104 from the heat transfer unit 101. The heat transfer unit 101 attaches to housing 104 to secure the heat transfer sleeve 110 within housing 104.

Cap 102 releasably attaches to housing 104 to maintain a heat transfer sleeve within housing 104. Cap 102 has a beverage aperture adapted to receive a beverage or a beverage container. The beverage container may be a receptacle for holding a beverage, such as a can, bottle, cup, glass, or other type of receptacle capable of holding a beverage. The cap 102 secures the heat transfer sleeve within housing 104.

Figure 2:
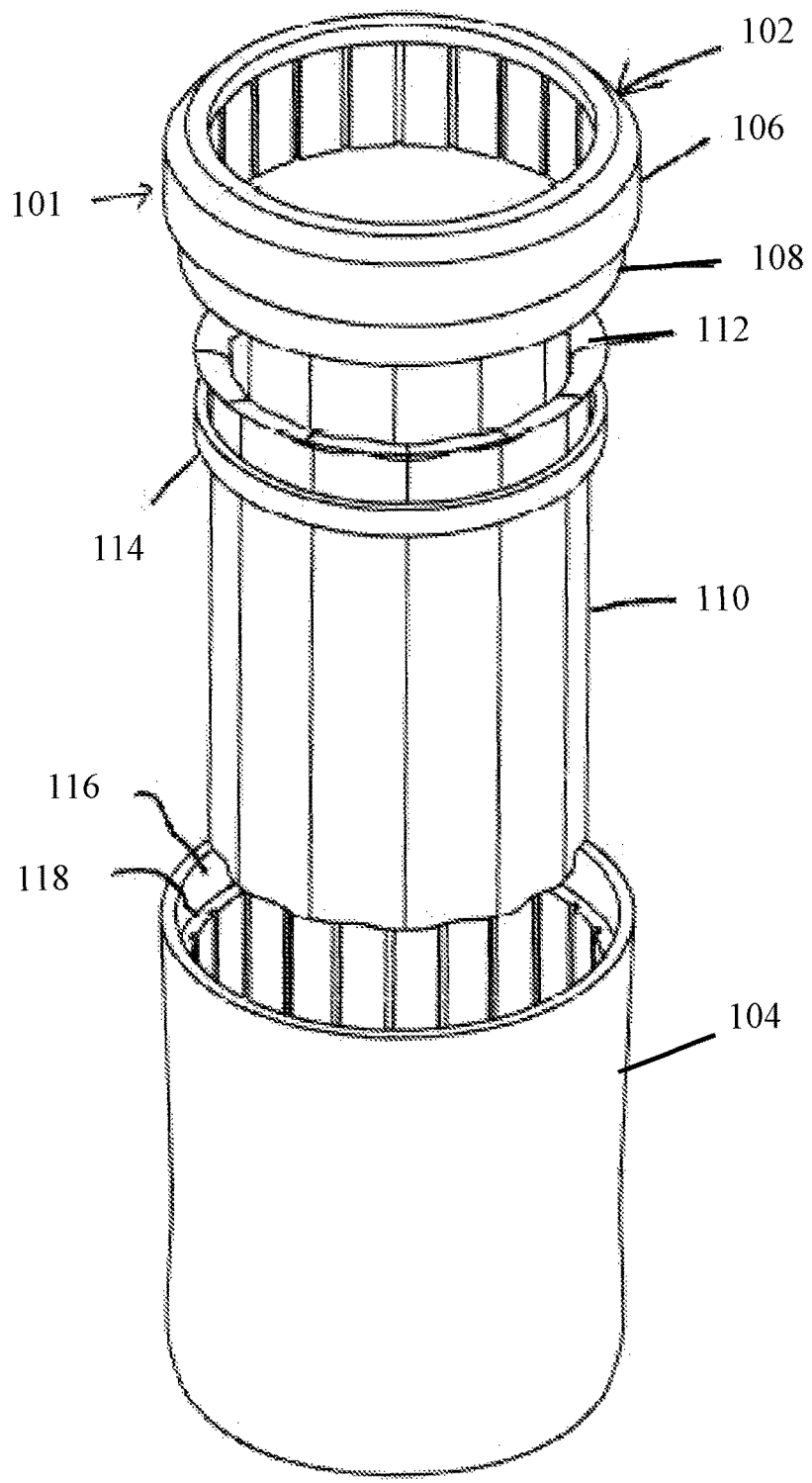
FIG. 2 is an exploded view thereof.

FIG. 2 shows an exploded view of the present invention. Cap 102 attaches with the attachment lip 112 of heat transfer sleeve 110 and locking body 114. Locking body 114 contacts attachment lip 112 of heat transfer sleeve 110 for attachment of heat transfer sleeve 110 to cap 102. In one embodiment, locking body 114 adhesively attaches with cap 102 to attach heat transfer sleeve 110 to cap 102. Locking body 114 may also be mated with cap 102 by a threaded attachment to attach heat transfer sleeve 110 to cap 102. Cap 102 may also be attached by tongue and groove, radio frequency welding, sonic welding, adhesive attachment, or other known methods. In another embodiment, discussed below, mounting heads found on the top of the cap body are positioned within receiving apertures of the heat transfer sleeve. A separate cap head is then attached to secure the heat transfer sleeve to the cap to form the heat transfer unit.

Continuing to refer to FIG. 2, heat transfer sleeve 110 stores a heat transfer material such as fluid, gel, or other substance that can be heated or cooled depending upon the desired effect on the beverage. In one embodiment, the present invention may cool a beverage such that the heat transfer sleeve 110 stores a coolant, including but not limited to a liquid or fluid, such as water, a gel, or a chemical that will cause an endothermic reaction. In another embodiment, the present invention may heat a beverage such that the heat transfer sleeve 110 stores a heat supplying material or a chemical that will cause an exothermic reaction.

In some embodiments, the coolant may have properties such as a low freezing point and/or maintain a cold temperature for an extended period of time. In other embodiments, the heat supplying material may have properties such as a high boiling point and/or maintain a high temperature for an extended period of time. The heat transfer sleeve 110 may also be filled with non-toxic material.

The heat transfer sleeve 110 may be constructed from plastic material including but not limited to a thermoplastic, polyethylene plastic, ethylene vinyl acetate, polypropylene, or polyethylene terephthalate. The heat transfer sleeve 110 may provide pockets adapted to store the heat transfer material. In one embodiment, the heat transfer sleeve 110 provides at least one pocket. In another embodiment, the heat transfer sleeve 110 provides vertical pockets, as shown in FIG. 2. In another embodiment, heat transfer sleeve may provide multiple pockets in a vertical orientation to prevent the heat transfer material from settling in the lower sections of the heat transfer sleeve 110. Other embodiments of the present invention may include a heat transfer sleeve with horizontal pockets, at least one spiral shaped pocket, multiple parallelogram shaped pockets, multiple pockets, or other variations. In another embodiment, the heat transfer sleeve 110 utilizes multiple hexagonal pockets in a honey combed shape. In one embodiment, the heat transfer sleeve has an inner wall and an outer wall that are sealed to store the heat transfer material.

The heat transfer sleeve 110 is preferably constructed from a pair of containment sheets ideally comprising a material that maintains flexibility at below freezing temperatures, such as, for example, a thermoplastic or similar material so that the cooling cavities may be formed by heat sealing, sonic welding, or radio frequency welding of the two containment sheets. Each of the pockets of the heat transfer sleeve has a heat transfer material capable of being cooled or heated. Preferably, each of the pockets is substantially filled with the heat transfer material. Ideally, the cooling substance comprises a freezable gel or liquid, which changes state at 20 to 32 degrees F. While water may be used as the freezable coolant, other substances which have superior cold retention properties are preferred.

Continuing to refer to FIG. 2, the attachment base 108 of cap 102 tapers inward such that the attachment base 108 is found interior of cap body 106 in one embodiment of the present invention. Attachment base 108 is designed to fit within housing 104 to secure cap 102 to housing 104. Attachment base 108 extends into housing 104 when cap 102 releasably attaches to housing 104. Attachment base 108 directs heat transfer sleeve 110 into the interior of housing 104.

In another embodiment, not shown, attachment base 108 extends outward such that attachment base 108 is located exterior of housing 104 when cap 102 releasably attaches to housing 104. In this embodiment, housing 104 directs heat transfer sleeve 110 into housing 104.

The attachment base 108 attaches to retention head 116 to secure cap 102 with housing 104 to maintain heat transfer sleeve 110 within housing 104. In one embodiment, attachment base 108 of cap 102 provides a threaded surface that engages the retention head 116 of housing 104 to secure cap 102 to housing 104. In another embodiment, retention head 116 of housing 104 provides a threaded surface that engages the attachment base 108 of cap 102 to secure housing 104 to cap 102. Other embodiments of the present invention attach the cap to housing though compression fit, a tongue and groove system, and other known releasably attachments.

Figure 3:
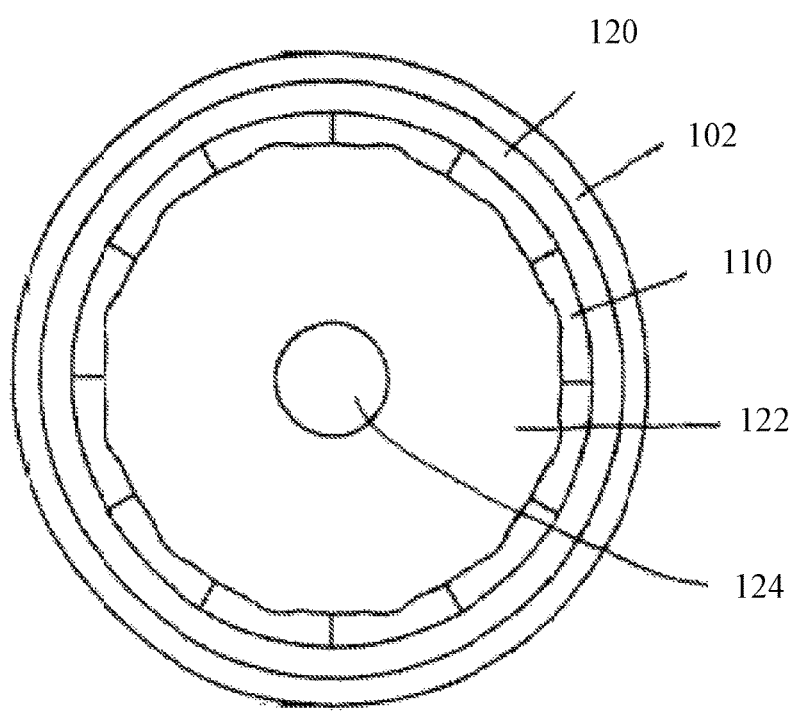
FIG. 3 is a top view thereof.

FIG. 3 shows a top view of the present invention. In this embodiment, cap 102 extends outwards at least as much as housing 104. Cap head 110 tapers inward from cap body 106. Heat transfer sleeve 110 found within housing 104 lines the interior of housing 104 for contact with the beverage and/or beverage container. Heat transfer sleeve 110 forms a receiving aperture 122 within housing 104 adapted to accept a beverage and/or beverage container. The heat transfer sleeve 110 contacts the beverage and/or beverage container to affect the temperature of the beverage. One embodiment of the present invention provides a removal aperture 124 adapted to allow easier insertion and removal of a beverage container into the receiving aperture 122. The removal aperture 124 provides a pathway for removal of trapped gas under the beverage container to ease insertion of the beverage container into housing 104. The removal aperture 124 is large enough to allow a user to insert his finger to adjust the beverage container within housing 104. The removal aperture 124 also allows a user to remove the beverage container out of housing 104 by applying force from the underside of the beverage container. The removal aperture may be optional as some uses of the present invention may not require the removal aperture.

Figure 4:
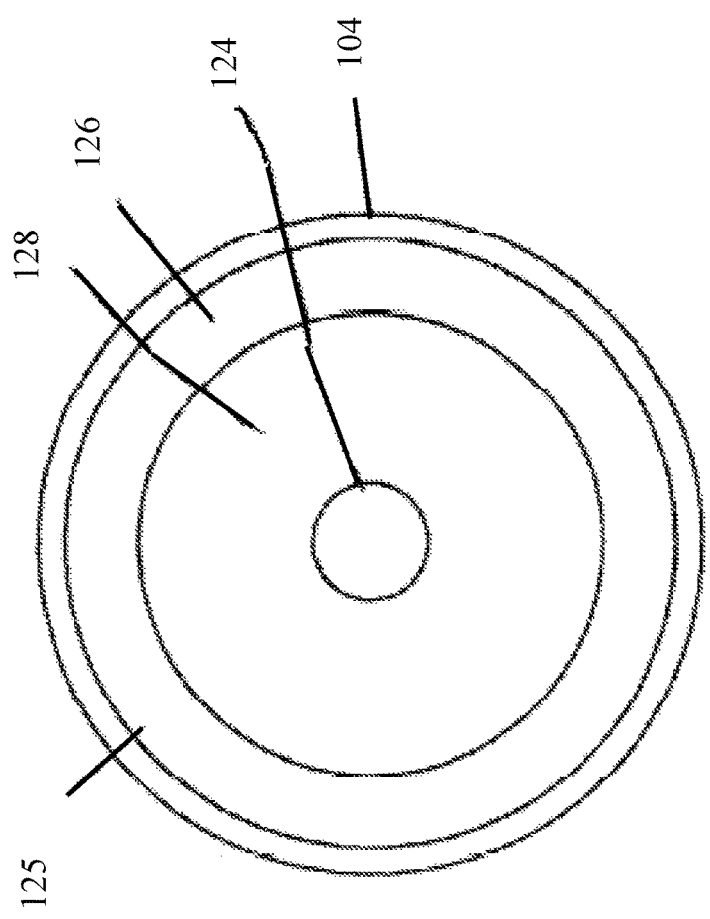
FIG. 4 is a bottom view thereof.

FIG. 4 shows a bottom view of the present invention. The housing bottom 125 provides an inner base 128 and an outer base 126. In one embodiment, inner base 128 extends upward toward receiving aperture 122 to increase a user's access to the underside of a beverage container through removal aperture to simplify removing the beverage container. Outer base 126 balances housing 104 on a support surface. Outer base 126 may be formed as a contiguous part of housing 104 or may be an additional structure formed from a non-skid material such as a thermoplastic elastomer (TPE). In addition, housing bottom 125 provides removal aperture 124 to enable user to remove a beverage container from housing 104.

Figure 5:
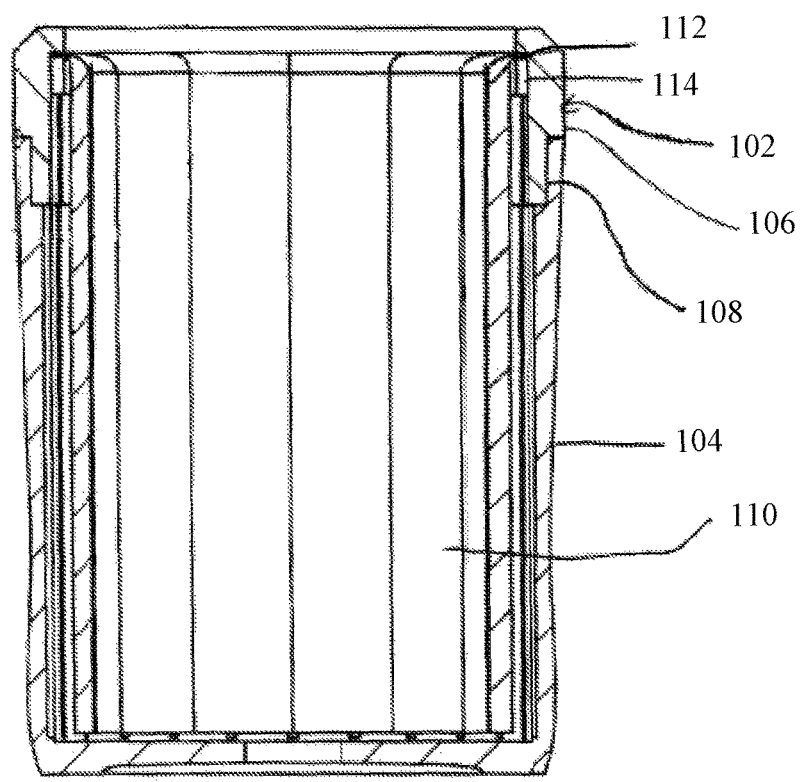
FIG. 5 is a sectional view of one embodiment of the present invention.
Figure 6:
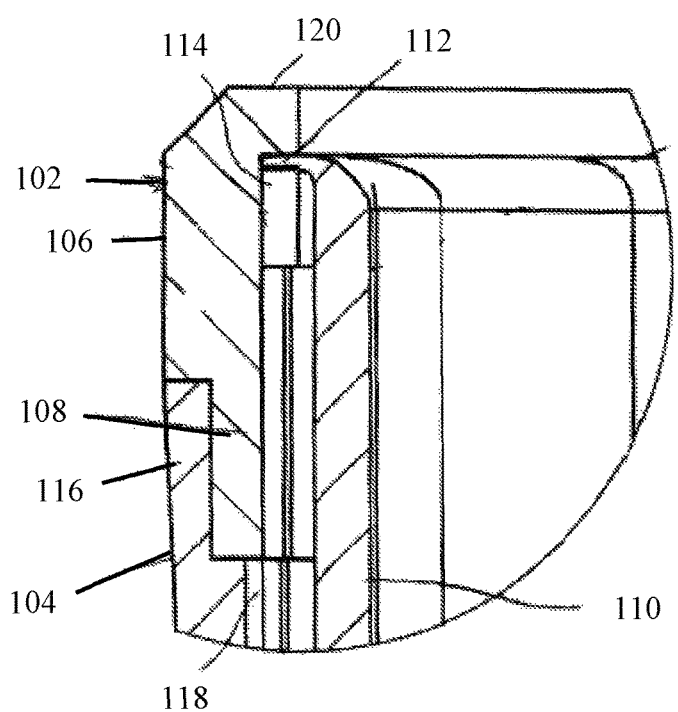
FIG. 6 is a portion of a sectional view thereof.

FIGS. 5 and 6 show a cross section view of the present invention. Cap 102 releasably attaches to housing 104. Attachment base 108 of cap 102 narrows such that attachment base 108 fits within housing 104 for securing cap 102 to housing 104. Heat transfer sleeve 110 lines the interior of housing 104 to either directly or indirectly contact beverage within housing 104 to adjust the temperature of the beverage.

FIG. 6 shows an enlarged view of the attachment of the cap 102 to housing 104 and fastening of the heat transfer sleeve 110 to the cap 102. Attachment lip 112 is secured between cap head 120 and locking body 114. In one embodiment of the present invention, luting may be found below the attachment of locking body 114. Attachment base 108 of the cap 102 extends inward from cap body 106 to allow the exterior of cap body 106 to be flush with the exterior of housing 104. Attachment base 108 is sized to fit inside of housing 104. Attachment base 108 is threaded to attach the threaded portion of retention head 116. Housing 104 secures attachment base 108 such that attachment base 108 is stored essentially flush with retention neck 118 of housing 104. As noted above, the cap may be attached to the housing by other known methods including but not limited to compression fit, tongue and groove, and other known attachment methods.

Figure 7:
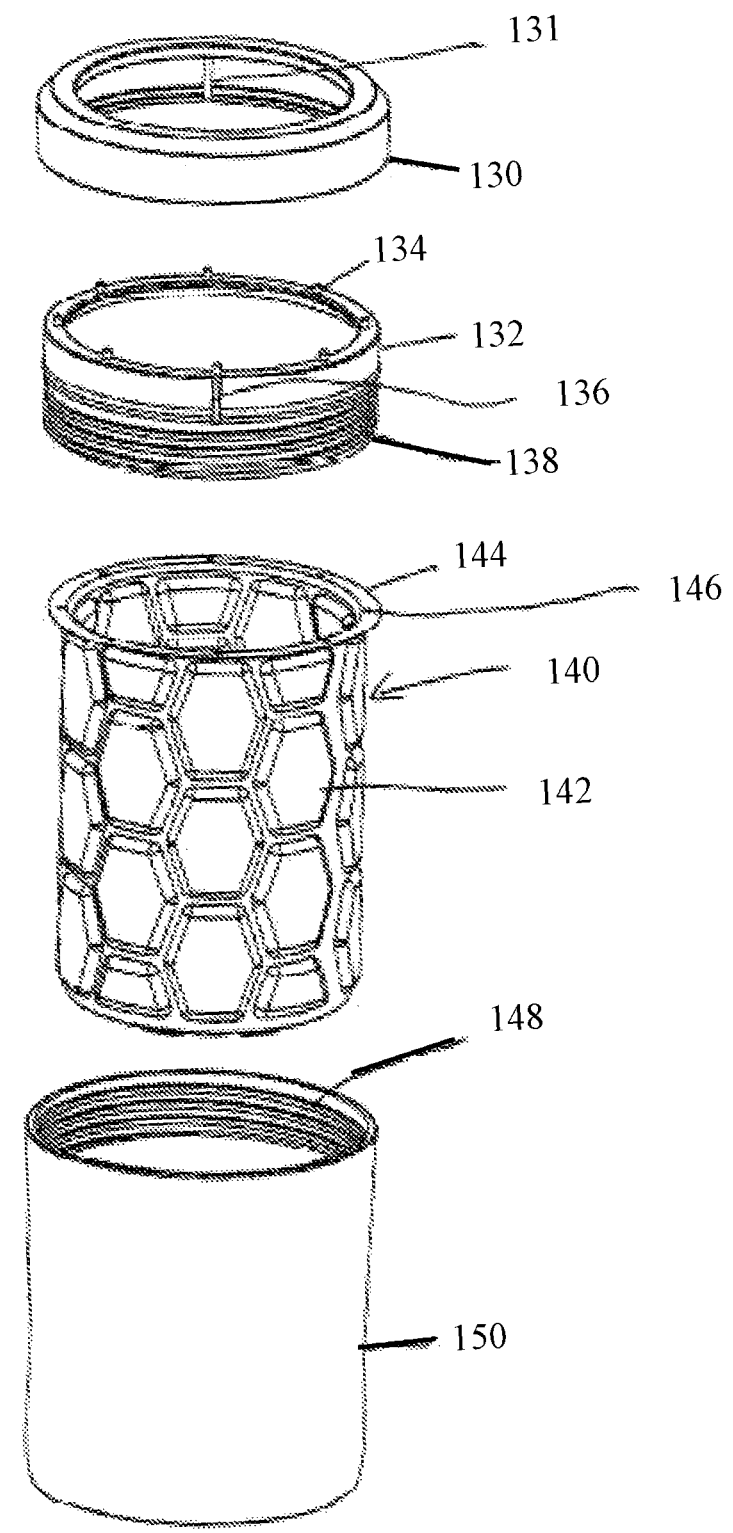
FIG. 7 is an exploded view of another embodiment of the present invention.
Figure 8:
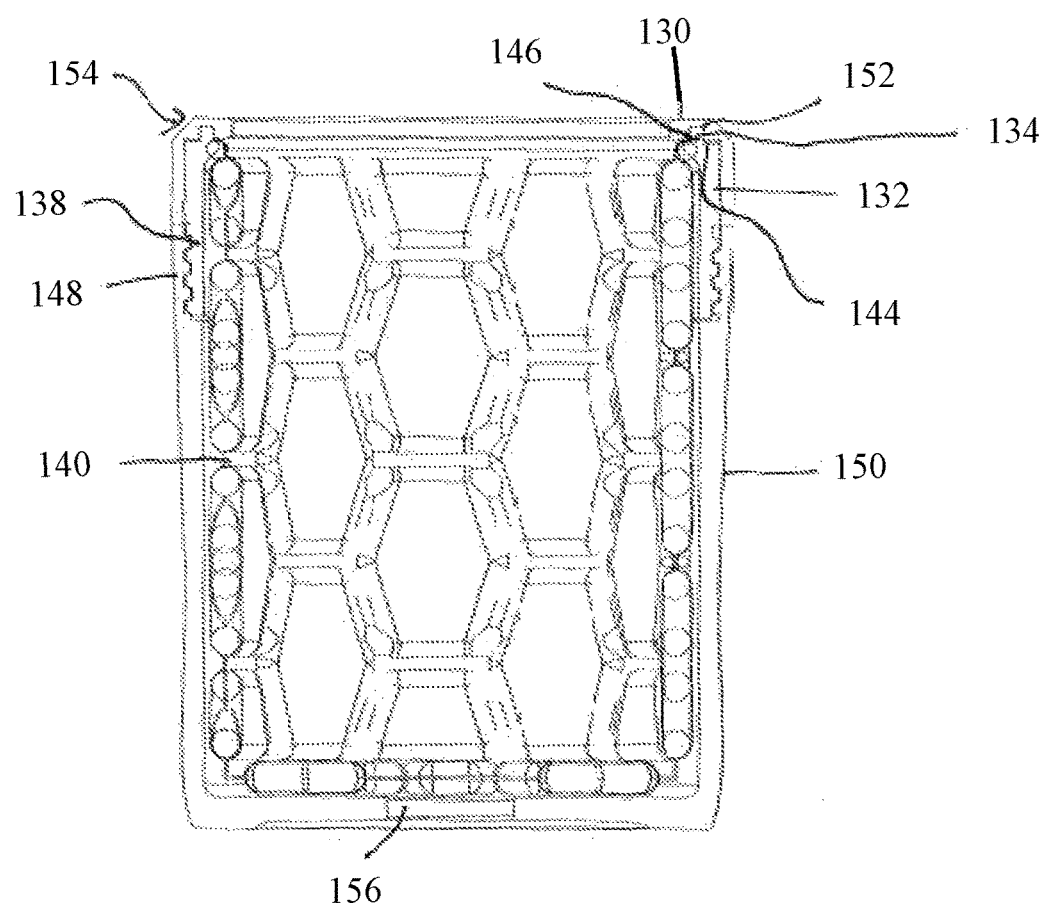
FIG. 8 is a cross sectional view thereof.
Figure 10:
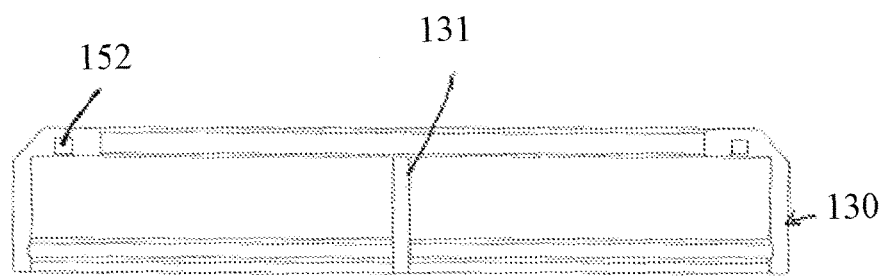
FIG. 10 is a cross sectional view of a cap head of one embodiment of the present invention.

FIGS. 7 and 8 show another embodiment of the present invention. Cap head 130, shown in FIG. 10, attaches to cap body 132 to form a cap. Cap head 130 attaches to cap body 132 such that cap head 130 will rotate with cap body 132 during rotation. To secure cap head 130 with cap body 132, attachment finger 136 inserts into attachment aperture 131 to allow for rotation of cap head 130 with cap body 132. FIG.

12 shows one embodiment of the cap body 132. Mounting heads 134 of cap body 132 further secure cap body 132 to cap head 130. Mounting heads 134 protrude upwards to be inserted into mounting apertures found on the underside of cap head 130. The mounting heads 134 extend upwards into the mounting apertures. In another embodiment, the attachment finger may be located on the cap head and the attachment aperture may be located on the cap body. Likewise, the mounting heads may be placed on the cap head and the mounting apertures may be placed on the cap body.

Mounting heads 134 also extend upwards to secure the heat transfer sleeve 140 to cap. Heat transfer sleeve 140 provides an attachment lip 144 with attachment apertures 146. The attachment lip 144 protrudes outward laterally to extend outward from heat transfer sleeve 140. Because attachment lip 144 extends outward, heat transfer sleeve 140 inserts into cap body 132 to allow heat transfer sleeve 140 to be placed within housing 150. As shown in FIG. 8, attachment lip extends outwards above the top of cap body 132 for insertion of mounting heads 134 through the attachment apertures 146. The mounting heads 134 pass through attachment apertures 146 before being inserted into the mounting apertures 152 of cap head 130 to secure the attachment lip 144 between the top of body 132 and the interior of cap head 130. The cap body 132 and cap head 130 attach to each other to form the cap with the heat transfer sleeve 140 secured within. In one embodiment, cap body 132 may be attached to the cap head 130 by attachment methods including but not limited to adhesive attachment, threaded attachment, tongue and groove attachment, sonic welding, radio frequency welding, or applied adhesive.

Figure 14:
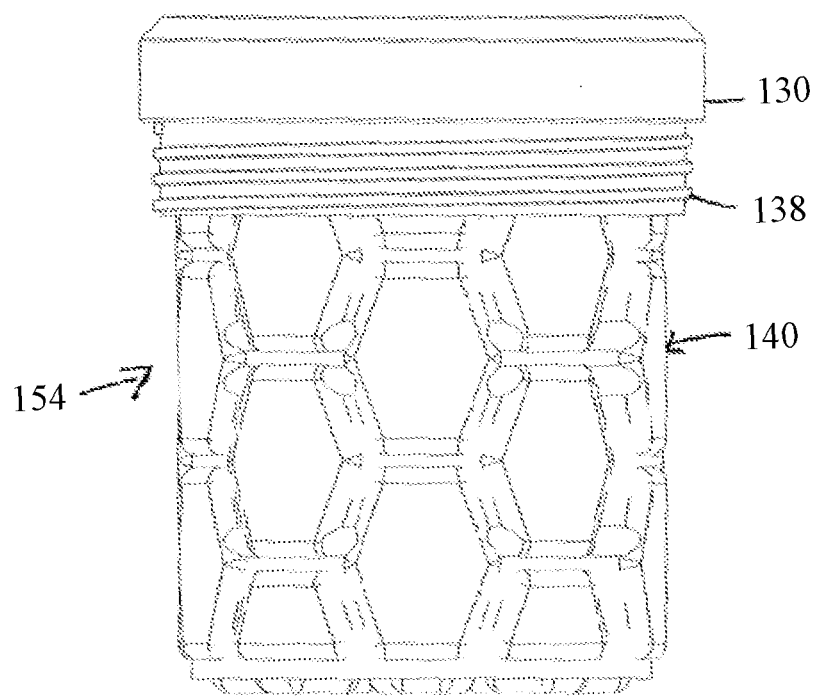
FIG. 14 is a front view of a heat transfer unit of one embodiment of the present invention.

The cap head 130, cap body 132 and heat transfer sleeve 140 secure to one another to form a heat transfer unit 154, a cooling unit or a heating unit, depending upon the function desired by the user as shown in FIG. 14. FIG. 8 shows the attachment of the heat transfer unit 154. The heat transfer unit 154 is a single unit that may be installed and removed from the housing 150. A user may remove the heat transfer unit 154 to recharge the heat transfer sleeve 140 by either cooling or heating the heat transfer unit 154 depending upon the desired function. Removing housing 150 decreases the time needed to heat or cool the transfer unit because of the reduced insulation due to the removal of housing 150 from the heat transfer unit 154. The heat transfer unit 154 attaches to housing 150 to secure the heat transfer sleeve 140 within housing 150. Attachment base 138 provides a threaded surface to engage a threaded surface of retention head 148. The threaded connections of the attachment base 138 and retention head 148 secure the cap to the housing 150. The threaded attachment may be a regular threaded connection or a reversed threaded connection. As noted above, other methods of attachment of the cap to the housing may be utilized including but not limited to compression fit, tongue and groove, a releasable attachments, and other methods of attachment.

Figure 11:
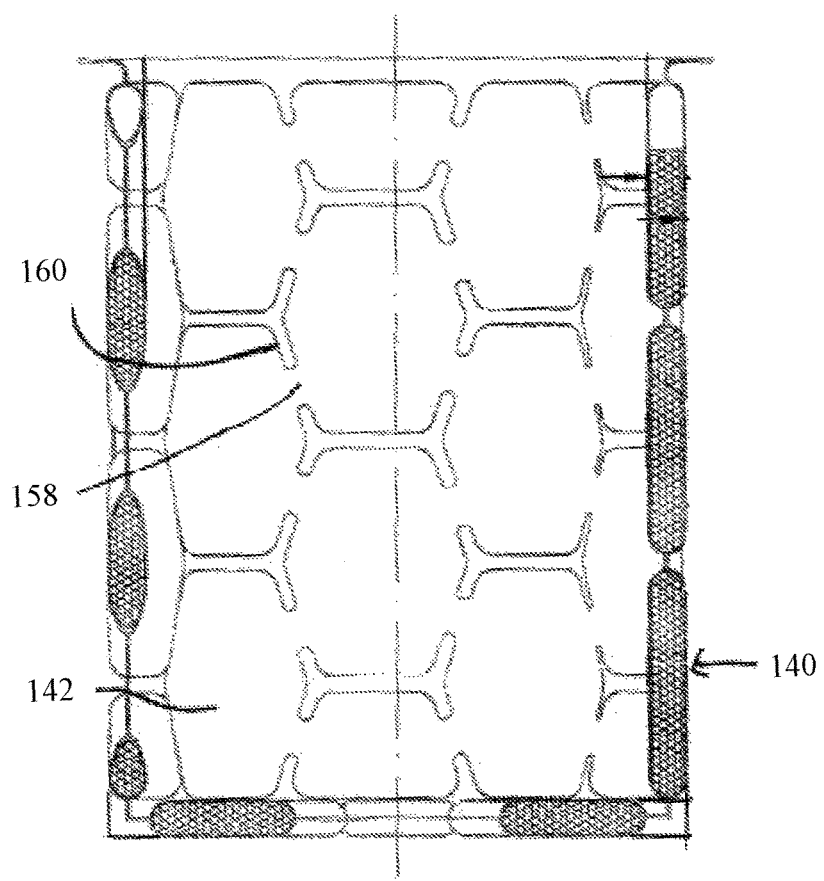
FIG. 11 is a cross sectional view of a heat transfer sleeve of one embodiment of the present invention.
Figure 12:
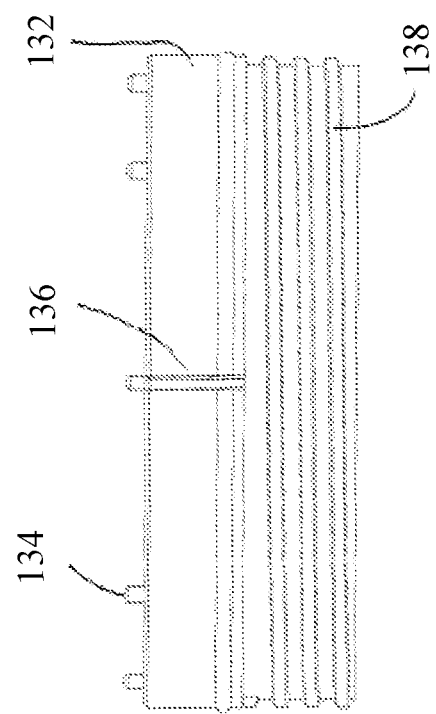
FIG. 12 is a side view of a cap body of one embodiment of the present invention.

Continuing to refer to FIGS. 8 and 11, the pockets 142 store the heat transfer material including but not limited to a liquid, a gel, water or other substance that can be heated or cooled depending upon the desired effect on the beverage. In one embodiment, pocket walls 160 form each pocket 142. Other embodiments of the present invention may include a heat transfer sleeve with vertical pockets, horizontal pockets, at least one spiral shaped pocket, multiple parallelogram shaped pockets, multiple pockets, or other variations. The pocket walls may be formed by attachment of the inner wall and outer wall of the heat transfer sleeve. The pocket walls 160 retain an amount of the heat transfer material within each pocket 142. Pocket apertures 158 allow the heat transfer material to flow from pocket 142 to pocket 142. The pockets 142 formed by the pocket walls 160 decrease production costs and reduce production time due to the ease of filling each heat transfer sleeve 140. The multiple pockets also allow for uniform distribution of the heat transfer material through the heat transfer sleeve.

Figure 9:
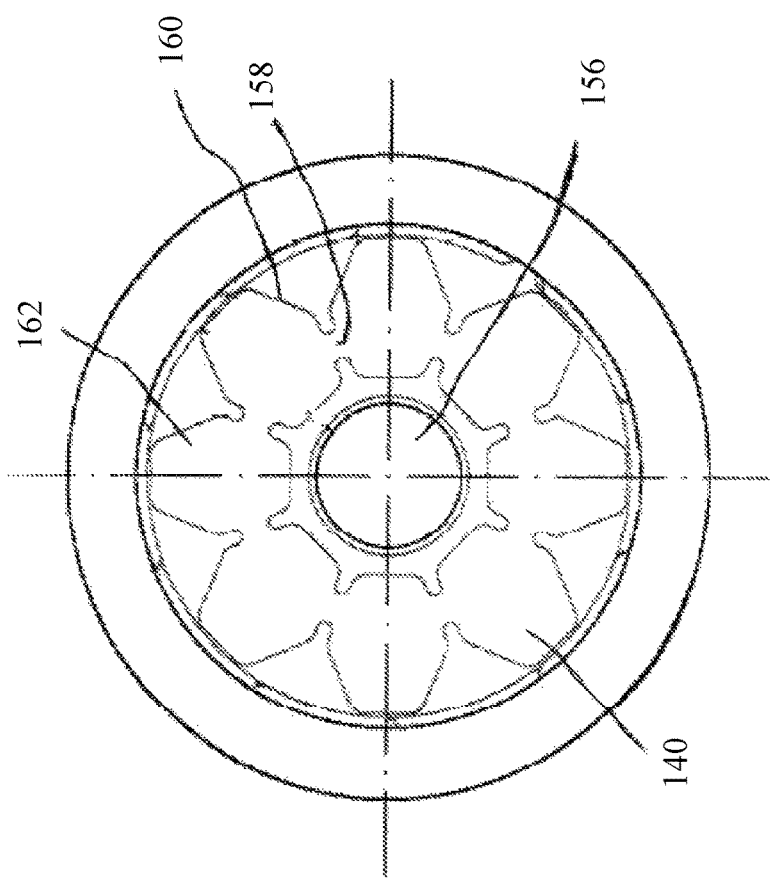
FIG. 9 is a top cross sectional view thereof.

FIG. 9 shows the attachment of cap head 130 and cap body 132. Attachment finger 136 inserts into attachment aperture 131. The insertion of attachment finger 136 into attachment aperture 131 allows cap head 130 to rotate with cap body 132 when the two are combined to form the cap. FIG. 9 also shows the bottom of the heat transfer sleeve 140. Bottom pockets 162 are also formed by pocket walls 160. However, the bottom pockets 162 have pocket apertures 158 between the two adjacent bottom pockets 162. The pocket apertures 158 between the bottom pockets 162 allow the heat transfer material to flow between each bottom pocket 162. In another embodiment, the heat transfer sleeve does not have bottom pockets such that the bottom of the heat transfer sleeve is open.

Figure 13:
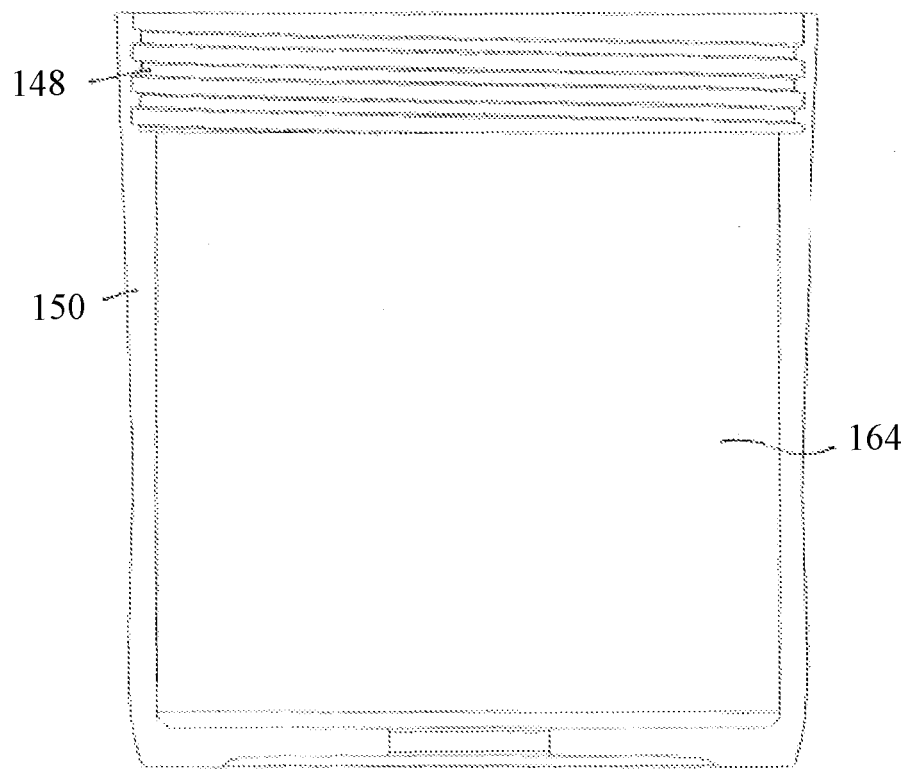
FIG. 13 is a cross sectional view of a housing of one embodiment of the present invention.
Figure 15:
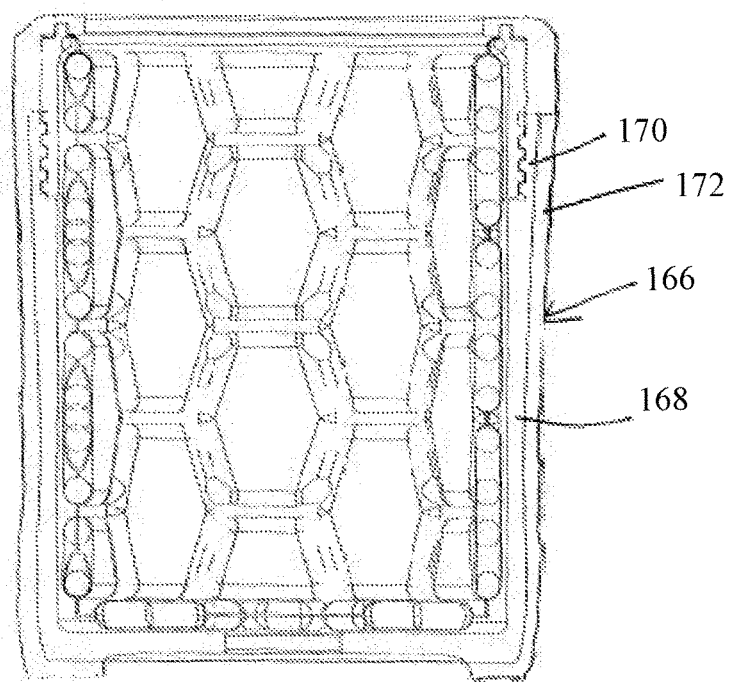
FIG. 15 is a cross sectional view of one embodiment of the present invention.

FIG. 13 shows a cross sectional view of housing 150. Housing 150 provides a receiving aperture 164 that stores a portion of the heat transfer sleeve 140. Retention head 148 provides a threaded surface of housing 150 for attachment of the heat transfer unit 154 to housing 150. FIG. 15 shows another embodiment of housing 166 that provides a metal interior 168. The retention head 170 is also constructed from metal. The metal interior is coated with an insulating surface 170 constructed from foam, EVA foam, or other insulating material such as silicone, polyurethane, or ceramic materials.

Figure 16:
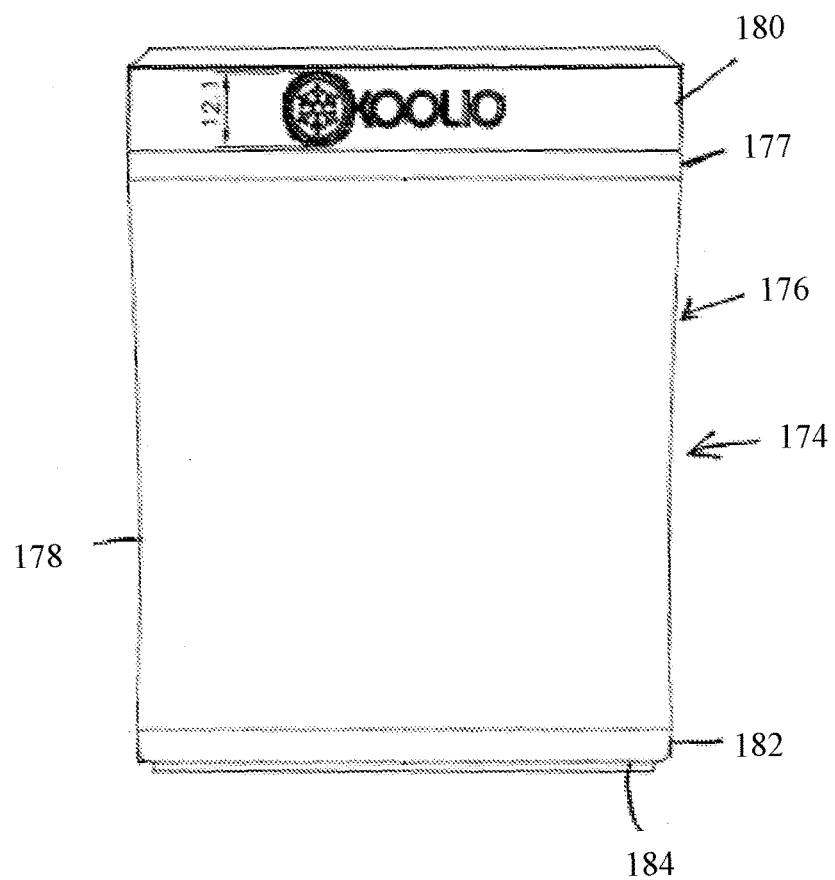
FIG. 16 is a front view of one embodiment of the present invention.

FIG. 16 shows another embodiment shown as 174 in which the heat transfer body is stored loosely within the housing 176. The housing 176 provides an opening for storing a beverage container within the housing. The heat transfer body is stored within the housing 176 to contact the beverage container or at least be in close proximity to the beverage container. The user inserts a beverage container into heat transfer body and the housing to maintain the temperature of the beverage and to adjust the temperature of the beverage. Both the housing and the heat transfer body provide an opening, insertion aperture, for insertion of the beverage container into the housing and the heat transfer body.

An outer insulator 178 is placed around the housing 176 to increase the insulation of the housing 176. The outer insulator 178 may be constructed from silicone, foam, Styrofoam, neoprene, or other insulating materials. The outer insulator 178 helps maintain the temperatures of the heat transfer body and the beverage. The outer insulator 178 also provides a layer of insulation between the user's hand and the housing. Such insulation prevents heat transfer from the user's hand to the housing, beverage, and the heat transfer body. The outer insulator 178 also provides an area for the user to comfortably hold the housing 176.

In one embodiment, the outer insulator 178 is simply placed around the housing 176. The neck 177 and the base 182 of housing 176 help secure the outer insulator 178 on the housing 176. In another embodiment, the outer insulator 178 is attached to the housing to prevent removal of the outer insulator 178 from housing 176.

The retention head 180 attaches to the housing 176 to secure the heat transfer body within housing. In one embodiment, the retention head 180 releasably attaches to the housing 176 to allow a user to attach and remove the retention head 180 from the housing 176. Removing the retention head 180 from the housing 176 provides the user with access to the heat transfer body 186. The user removes the retention head 180 from the housing 176 to both install and remove the heat transfer body 180 from the housing 176.

To remove the heat transfer body 186, the user first removes the retention head 180 from housing 176. The user then removes the heat transfer body 186 from the housing 176.

To install the heat transfer body 186 into housing 180, the user removes the retention head 180 from housing 176. With access to the interior of the housing, the user inserts the heat transfer body 186 into housing 176. The user then secures the heat transfer body 186 into housing 176 by attaching retention head 180 to housing 176.

One embodiment of the present inventions provides a foot 184 attached to the base 182. The foot 184 provides additional friction to the housing. The foot 184 helps maintain the position of the housing 180 and prevents the housing 180 from slipping when placed on a surface. The foot 184 may be constructed from a piece of silicone, rubber, foam, plastic, or other material.

Figure 17:
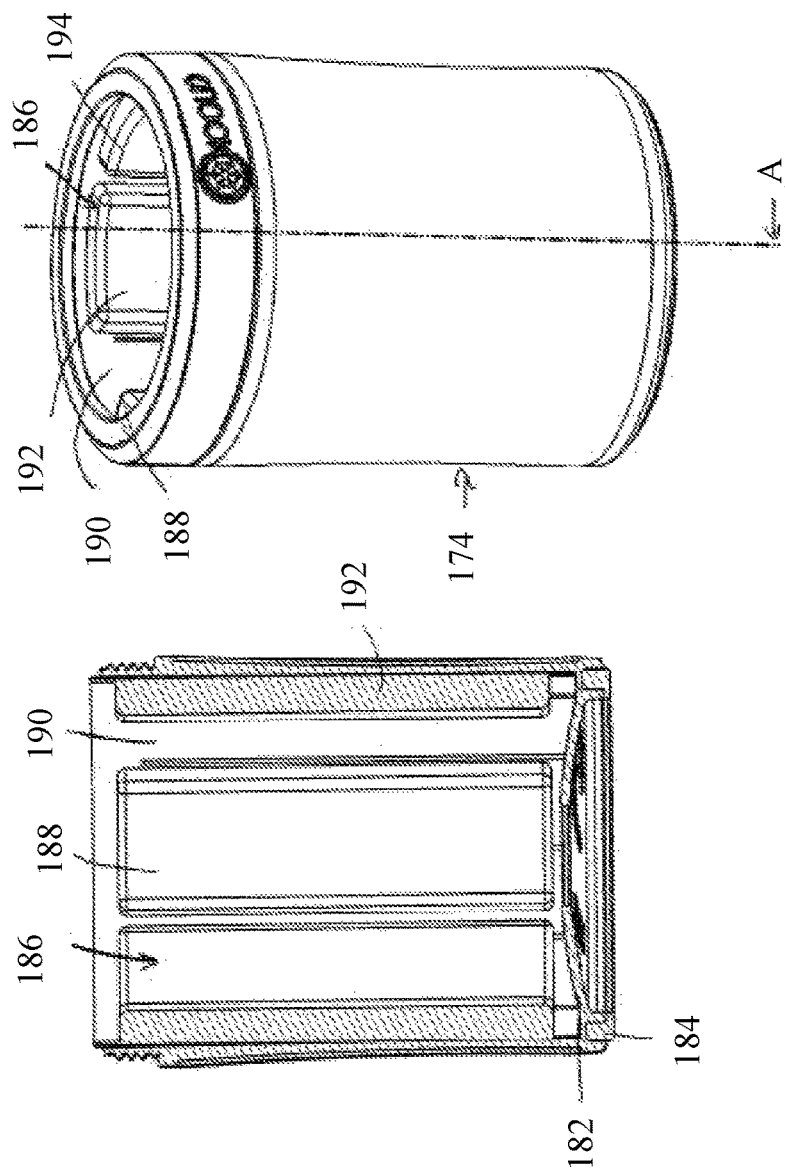
FIG. 17 is a perspective view thereof.

FIGS. 17, 17B, 24, and 25 show the heat transfer body 186 and the heat transfer pockets 188, 192, 194, 206, 208, 210 of the unit. The heat transfer pockets 188, 192, 194, 206, 208, 210 store the heat transfer material. As discussed above, the heat transfer body 186 may be constructed from plastic material including but not limited to a thermoplastic, polyethylene plastic, ethylene vinyl acetate, polypropylene, or polyethylene terephthalate. The heat transfer body 186 provides heat transfer pockets 188, 192, 194, 206, 208, 210 that store the heat transfer material. In one embodiment, the heat transfer body 186 provides at least one pocket. In another embodiment, the heat transfer body 186 provides vertical pockets, as shown in FIG. 17B. In another embodiment, the heat transfer unit may provide multiple pockets in a vertical orientation to prevent the heat transfer material from settling in the lower sections of the heat transfer body. Other embodiments of the present invention may include a heat transfer unit with horizontal pockets, at least one spiral shaped pocket, multiple parallelogram shaped pockets, multiple pockets, or other variations. In another embodiment, the heat transfer unit utilizes multiple hexagonal pockets in a honey combed shape. In one embodiment, the heat transfer unit has an inner wall and an outer wall that are sealed to store the heat transfer material.

FIG. 17B shows a view of the heat transfer body 186. The heat transfer body 186 is preferably constructed from a pair of containment sheets ideally comprising a material that maintains flexibility at below freezing temperatures, such as, for example, a thermoplastic or similar material so that the cooling cavities may be formed by heat sealing, sonic welding, or radio frequency welding of the two containment sheets. Each of the heat transfer pockets of the heat transfer body 186 has a heat transfer material capable of being cooled or heated. Preferably, each of the pockets is substantially filled with the heat transfer material. Ideally, the cooling substance comprises a freezable gel or liquid, which changes state at 20 to 32 degrees F. While water may be used as the freezable coolant, other substances which have superior cold retention properties are preferred.

A heat transfer spacer 190 of the heat transfer body 186 increases the flexibility of the heat transfer body 186. In one embodiment, the heat transfer body 186 provides heat transfer pockets that are columns. Less heat transfer material or no heat transfer material is found between each transfer pocket to allow adjustment of the heat transfer body 186. Because the heat transfer material may become slightly rigid when frozen, the space between the columns increases the flexibility of the heat transfer body 186 to simplify placement of the heat transfer body 186 within the housing 176. The heat transfer spacer 190 also provides an area with less heat transfer material or no heat transfer material. In one embodiment, the heat transfer spacer is created by sonic welding to form the heat transfer body 186 into a sleeve to receive a beverage container.

Figure 18:
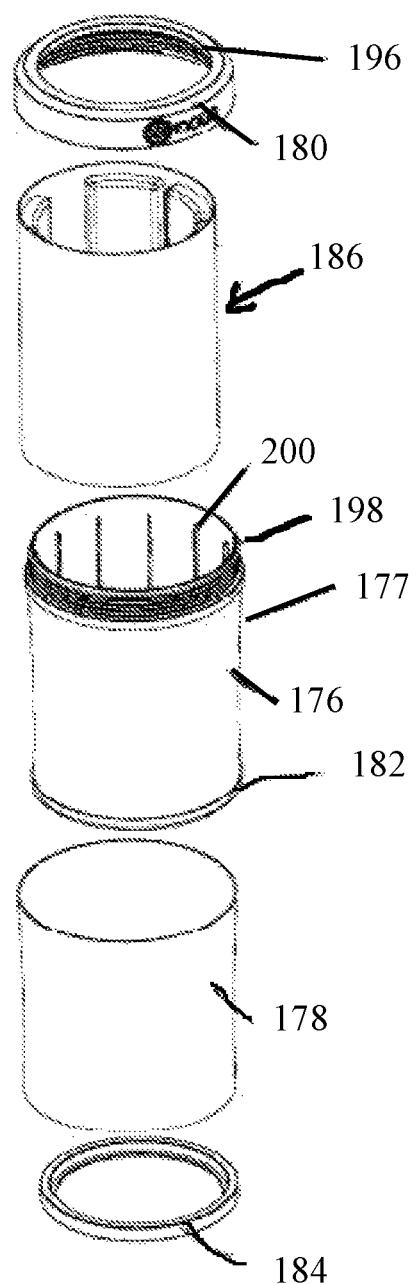
FIG. 18 is an exploded view of one embodiment of the present invention.

FIG. 18 shows an exploded view of the unit. Foot 184 attaches to base 182 of housing 176. The outer insulator 176 is secured around housing 176 between the base 182 and neck 177. The outer insulator 176 may be constructed from rubber, silicone, foam, or other insulating material. As described above, retention head 180 attaches to housing 176. In one embodiment, retention head 180 releasably attaches to housing 176 by a threaded attachment of threads 196, 198.

Heat transfer body 186 is placed within housing 176. The lesser amount of heat transfer material and/or no heat transfer material found at heat transfer spacer 190 and the spaces between the heat transfer pockets 188, 192, 194, 206, 208, 210 simplifies the process of the inserting and removing the heat transfer body 186 into housing 176.

To increase the insulation of the housing, separating fingers 200 extend inward from the inner wall of housing 176. The separating fingers 200 of one embodiment run approximately vertically within the housing 176. The vertical separating fingers 200 contact the heat transfer body 186 to provide some separation between the inner wall of housing 176 and the heat transfer body 186. The separation created by the separating fingers 200 creates air pockets between the inner wall of housing 176 and the heat transfer body 186. Each air pocket provides additional insulation for the beverage container. The separation created by the separating fingers 200 also reduces the friction between the transfer body 186 and the inner wall of housing 176. The separating fingers 200 simplify the process of inserting and removing the heat transfer body 186 from housing 176 by reducing the friction.

Figure 19:
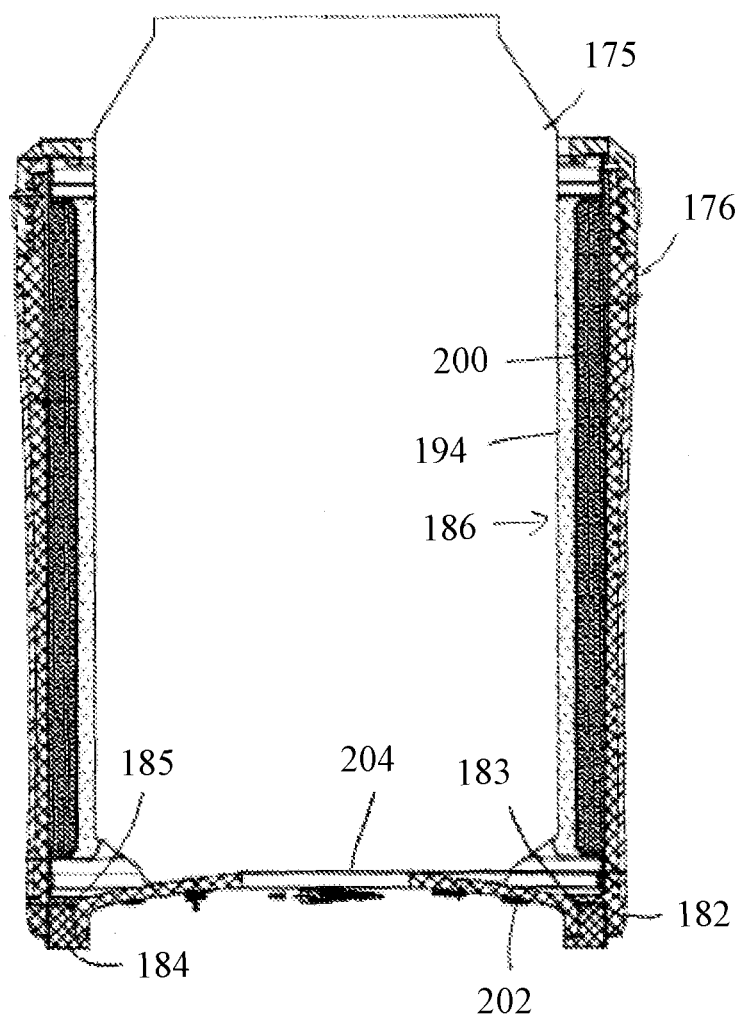
FIG. 19 is a cross sectional side view thereof.

FIG. 19 shows the beverage container 175, including but not limited to cans, bottles, cups, and other containers. The container 175 is inserted into housing 176 and the heat transfer body 186. In one embodiment, at least one heat transfer pocket 194 is located proximate to the container.

Access aperture 204 found at the base 182 provides an opening to reduce suction of the container 175 within the housing 176. The reduced suction simplifies the effort of inserting and removing the container 175 from the housing 176 and the heat transfer body 186. The access aperture 204 also allows a user to contact the bottom of the container 175 to assist with the removal of the container 175 from the housing 176 and the heat transfer body 186.

The base 182 provides a base extension 202 that increases the contact between the container 175 and the housing 176. Base extension 202 curves upward from the bottom of base 182. Such an embodiment directs moisture towards the inner wall of housing 176 and away from access aperture 204. Such an extension reduces the moisture that escapes through access aperture 204. The base extension of another embodiment may extend straight across.

The attachment of foot 184 shown in FIG. 19 will now be described in greater detail. The base 182 provides attachment aperture 183 for placement of foot extension 185 of foot 184. In one embodiment, attachment aperture 183 secures foot extension 185 to the base. In another embodiment, foot extension may be secured by adhesives or other attachment methods.

Figure 20:
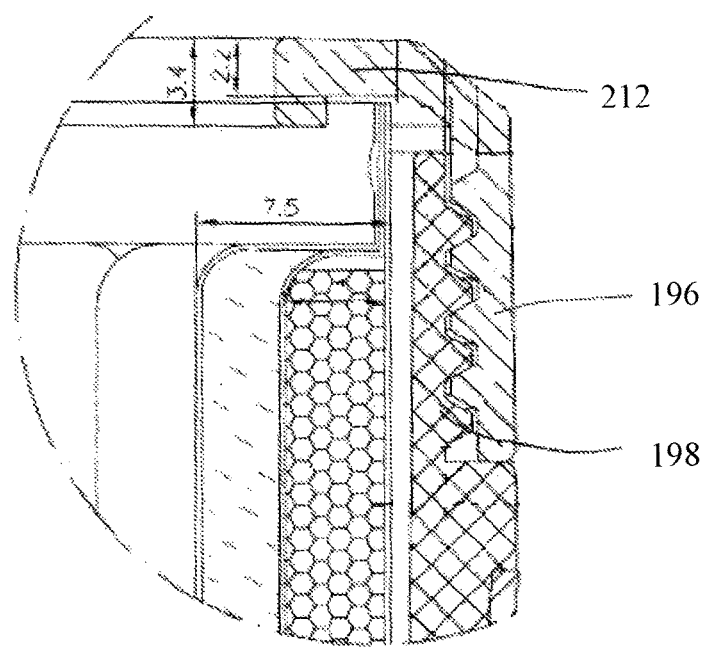
FIG. 20 is a cross sectional side view of a portion of one embodiment of the present invention.

FIG. 20 shows the attachment of retention head 180 to the housing 176 of one embodiment. Retention head 180 of such an embodiment is screwed onto housing 176 and secured by threads 196 of retention head 180 and threads 198 of housing 176. Head extension 212 also extends inward of the retention head 180 to help secure the heat transfer body 186. The head extension 212 decreases the area from which the heat transfer body 186 may be removed from the housing 176 while the retention head 180 is attached. The head extension 212 extends inward to contact heat transfer body 186 in case of removal of heat transfer body 186 while retention head 180 is attached.

Figure 21:
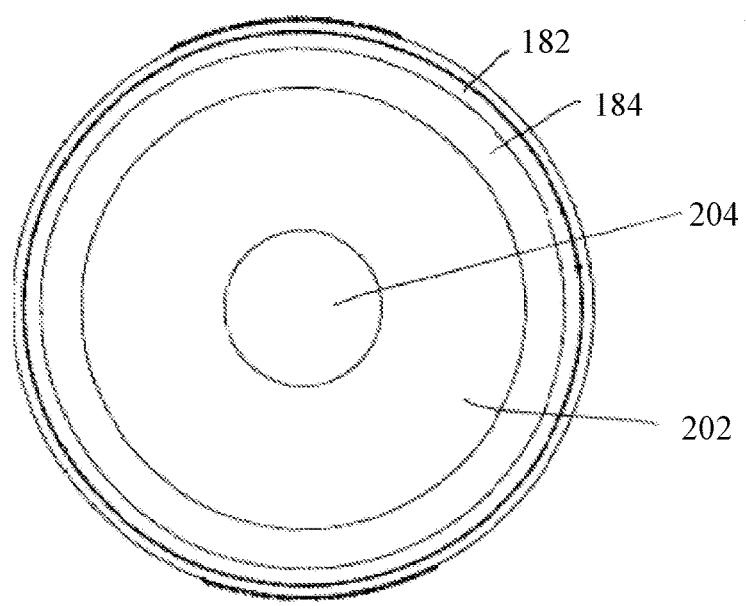
FIG. 21 is a bottom view thereof.

FIG. 21 shows a bottom view with the base extension 202 and base 182. The foot 184 found at the lowest portion of one embodiment provides a gripping surface for contacting surfaces the housing 176 is placed upon.

Figure 23:
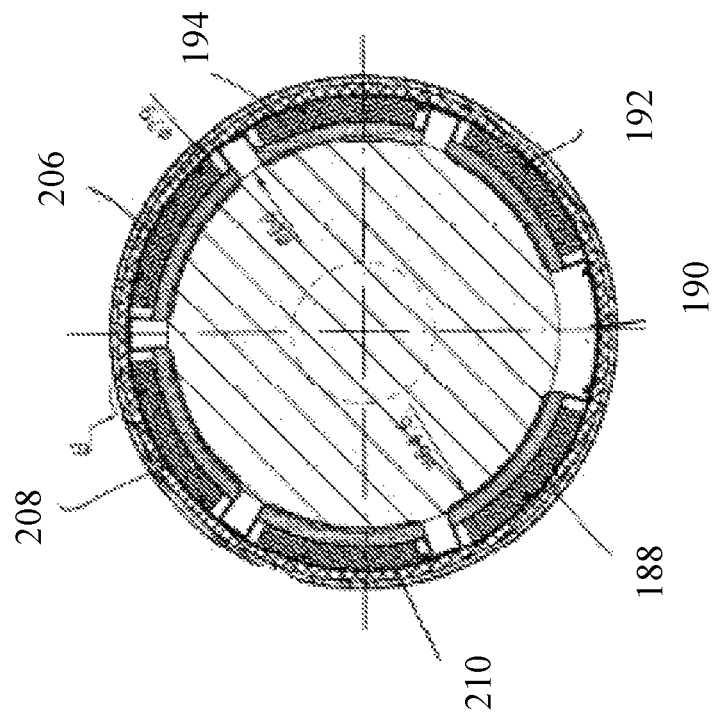
FIG. 23 is a cross sectional top view thereof.
Figure 22:
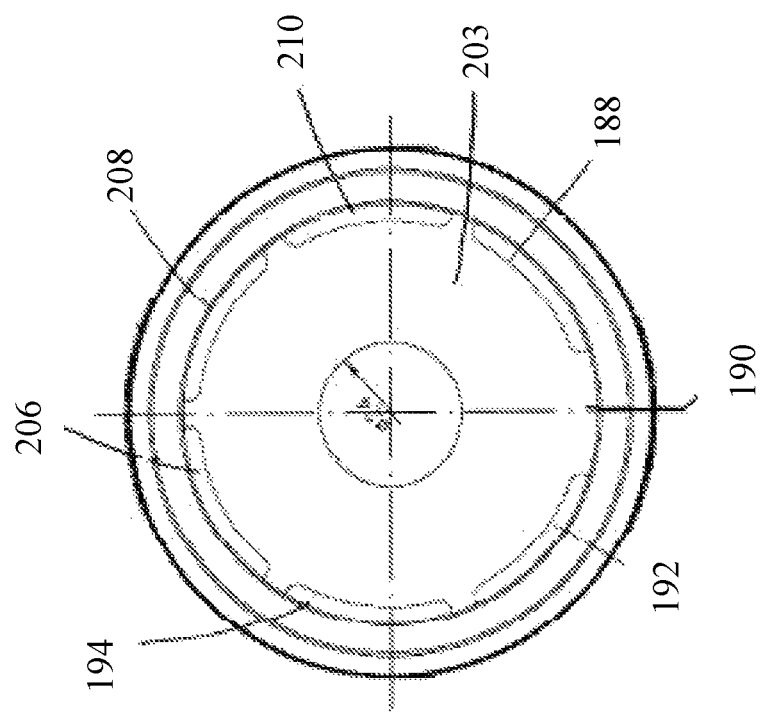
FIG. 22 is a top view thereof.

FIGS. 22 and 23 show a top view and a cross sectional view of one embodiment of the present invention. Heat transfer pockets 188, 192, 194, 206, 208, 210 are dispersed throughout the heat transfer body 186. The head extension 212 extends inward to limit removal of the heat transfer body 180 from housing 176 while the retention head 180 is attached. The container 175 is placed in the insertion aperture 203 for storage within housing 176 and heat transfer body 180.

FIG. 23 shows a cross sectional view providing more information regarding heat transfer pockets 188, 192, 194, 206, 208, 210. Heat transfer spacer 190 provides spacing to increase the flexibility of the heat transfer body 180, especially when frozen when the heat transfer body 180 is more rigid. As shown in FIG. 23, a spacer exists between each heat transfer pocket 188, 192, 194, 206, 208, 210. Each spacer contains less heat transfer material than the amount found in the heat transfer pockets 188, 192, 194, 206, 208, 210. In one embodiment, each spacer is filled with little to no heat transfer material.

Figure 24:
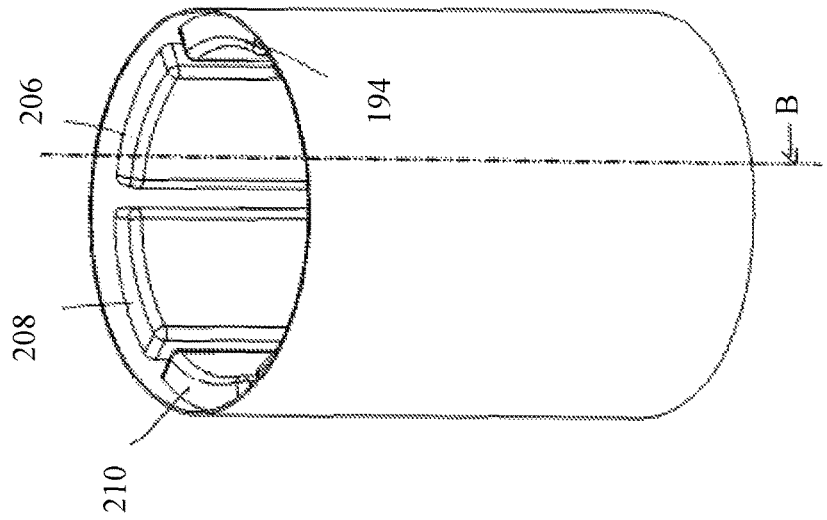
FIG. 24 is a perspective view of a portion of one embodiment of the present invention.
Figure 25:
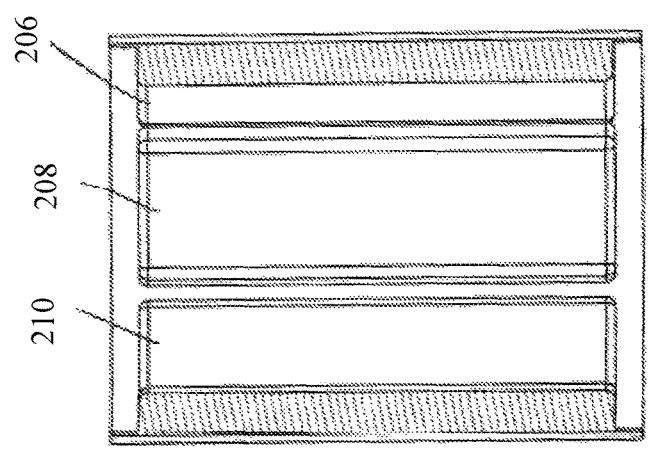
FIG. 25 is a cutaway view thereof.

FIGS. 24 and 25 show the heat transfer body 186, the heat transfer pockets 188, 192, 194, 206, 208, 210, and the spacers between the heat transfer pockets 188, 192, 194, 206, 208, 210. The spacers provide the flexibility to form a sleeve for holding the container 175. FIG. 25 shows an embodiment in which the heat transfer pockets 188, 192, 194, 206, 208, 210 are sealed to prevent the flow of the heat transfer material between the pockets. The sealed heat transfer pockets prevent the heat transfer material from accumulating on one side of the heat transfer body 180. Sealing the heat transfer pockets also helps distribute the heat transfer material across the container 175.

The removable heat transfer body allows the user to remove the heat transfer body from the housing for placement within a freezer or microwave. The user does not have to heat or cool the entire housing. By removing the heat transfer body 180 from the housing, the user can heat and cool the heat transfer body more efficient by not having to also heat the housing or any other components. The removable heat transfer body also reduces the amount of space needed to heat and cool the heat transfer body. Because the user can remove the housing and the other remaining components, the user can more efficiently store the heat transfer body within the freezer without requiring as much space.

The housing may be constructed from a semi-rigid material including but not limited to EVA plastic, and compression molded foam. The housing may also be constructed from a rigid material such as a metal or stainless steel covered in foam, EVA foam, or other insulating material such as silicone, polyurethane, or ceramic materials. Other embodiments do not cover the housing with the foam, EVA foam, or other insulating material. In another embodiment, the threaded portions of the invention such as the retention head and the attachment base may be constructed from a rigid material such as a plastic, metal, or stainless steel. In one embodiment of the present invention, the inner wall, outer wall, or both the inner wall and the outer wall of the heat transfer sleeve may be lined with nylon, polyester, or suede to simplify the process of inserting and removing the beverage container and/or the heat transfer unit.

The present invention provides multiple sized heat transfer units and housings capable of storing different types of beverage containers, including but not limited to cans, bottles, sport bottles, wine bottles of different sizes, cups, glasses, and other types of beverage containers.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for receiving a beverage container, the apparatus comprising:
    a heat transfer body adapted to receive the beverage container;
    a heat transfer material sealed within the heat transfer body;
    a housing adapted to receive the beverage container wherein the housing accepts placement of the heat transfer body within the housing, the heat transfer body separable from the housing and the beverage container wherein the heat transfer body is removable from the housing;
    an opening in the housing wherein the opening extends vertically downward into the housing, the opening receiving the heat transfer body and at least a portion of the beverage container;
    a heat transfer pocket of the heat transfer body, the heat transfer pocket storing the heat transfer material;
    the heat transfer pocket directly contacting the beverage container;
    a retention head removably attached to the housing, the retention head attaching to the housing to secure the heat transfer body within the housing, the retention head detaching from the housing for removal and insertion of the heat transfer body within the housing wherein the retention head is located radially outward from the housing at the attachment of the retention head to the housing;
    a side wall of the housing;
    a head extension protruding towards the interior of the housing wherein the head extension extends radially inward beyond an innermost portion of the side wall of the housing;
    the opening defining a vertical axis;
    a side wall of the housing defining the opening, an outer surface of the side wall located radially outward from the vertical axis defined by the opening;

a separating finger extending radially inward from an inner surface of the side wall towards an outer surface of the heat transfer pocket and the opening wherein the separating finger contacts the outer surface of the heat transfer pocket.

2. An apparatus for receiving a beverage container, the apparatus comprising:
a heat transfer body adapted to receive the beverage container;
a heat transfer material sealed within the heat transfer body;
a housing adapted to receive the beverage container wherein the housing accepts placement of the heat transfer body within the housing, the heat transfer body separable from the housing and the beverage container wherein the heat transfer body is removable from the housing;
an opening extending vertically downward into the housing wherein the opening receives the heat transfer body and at least a portion of the beverage container;
a side wall of the housing defining the opening, the side wall located radially outward from the opening, the side wall having an outer surface that is located radially outward from the opening, the outer surface of the side wall defining the radially outermost surface of the housing;
a heat transfer pocket of the heat transfer body, the heat transfer pocket storing the heat transfer material wherein the heat transfer material remains stored within the heat transfer body when the heat transfer body is separated from the housing and the beverage container;
the heat transfer pocket directly contacting the beverage container;
a separating finger protruding radially inwards from an inner surface of the side wall towards an outer surface of the heat transfer pocket and the opening wherein the separating finger contacts the outer surface of the heat transfer pocket, the separating finger extending vertically along an interior surface of the side wall;
a retention head removably attached to the housing, the retention head attaching to the housing to secure the heat transfer body within the housing, the retention head detaching from the housing for removal and insertion of the heat transfer body within the housing wherein a radially interior portion of the retention head contacts a radially outward portion of the housing to secure the retention head to the housing; and
a head extension of the retention head, the head extension extending radially inwards towards the opening of the housing wherein the head extension extends laterally inward beyond the side wall of the housing.

3. The apparatus of claim 2, the heat transfer pocket further comprising:
a pocket wall forming the heat transfer pocket, the pocket wall maintaining the heat transfer material within the heat transfer pocket.

4. The apparatus of claim 2 wherein the retention head is attached to the housing by a threaded connection.

5. The apparatus of claim 2 further comprising:
a first vertically oriented heat transfer pocket;
a second vertically oriented heat transfer pocket; and
a spacer located between the first heat transfer pocket and the second heat transfer pocket wherein the spacer contains less heat transfer material than the first heat transfer pocket and the second heat transfer pocket.

6. The apparatus of claim 2 further comprising:
an outer insulator constructed from an insulating material, the outer insulator secured to an outer surface of the housing wherein the housing is constructed from a rigid material.

7. An apparatus for receiving a beverage container, the apparatus comprising:
a heat transfer body adapted to receive the beverage container;
a heat transfer material sealed within the heat transfer body;
a housing adapted to receive the beverage container wherein the housing accepts placement of the heat transfer body within the housing, the heat transfer body separable from the housing and the beverage container wherein the heat transfer body is removable from the housing;
an opening extending vertically downward into the housing wherein the opening receives the heat transfer body and at least a portion of the beverage container;
a side wall of the housing defining the opening, the side wall located radially outward from the opening;
a heat transfer pocket of the heat transfer body, the heat transfer pocket storing the heat transfer material;
the heat transfer pocket directly contacting the beverage container;
a retention head attachable to the housing wherein the retention head attaches and detaches from the housing, the retention head when attached to the housing limits removal of the heat transfer body from the housing, the retention head extending radially inward beyond the side wall of the housing and towards the opening;
a thread of the retention head located on a radially interior surface of the retention head;
a thread of the housing located on a radially outward surface of the housing wherein the contact of the thread of the retention head with the thread of the housing secures the housing with the retention head wherein the retention head is located radially outward from the housing at the attachment of the retention head with the housing at the threads; and
the innermost portion of the retention head fixedly extending vertically downward parallel to the side wall;
a side wall of the housing defining the opening, an outer surface of the side wall located radially outward from a center of the opening;
a separating finger protruding radially inward from an inner surface of the side wall towards an outer surface of the heat transfer pocket and the opening wherein the separating finger extends vertically along the inner surface of the side wall.

8. The apparatus of claim 7 wherein the separating finger contacts the outer surface of the heat transfer pocket when the heat transfer pocket is installed in the housing.

* * * * *